May 21, 1968     M. H. POSTMAN     3,384,892

INTERROGATOR-RESPONDER SIGNALLING SYSTEM

Filed Nov. 7, 1966

INVENTOR.
MONROE H. POSTMAN
BY Leonard Zalman
ATTORNEY

United States Patent Office 3,384,892
Patented May 21, 1968

3,384,892
INTERROGATOR-RESPONDER SIGNALLING
SYSTEM
Monroe H. Postman, Sunnyvale, Calif., assignor to Philco-Ford Corporation, Philadelphia, Pa., a corporation of Delaware
Filed Nov. 7, 1966, Ser. No. 592,591
7 Claims. (Cl. 343—6.5)

ABSTRACT OF THE DISCLOSURE

An interrogator-responder signalling system having a plurality of responder devices each of which generates a response signal the frequency of which is a harmonic of the interrogator signal. Each responder device consists of a generally U shaped sheet of conductive material with a capacitor and a diode serially connected across the open end of the conductive material.

This invention relates to interrogator-responder signalling systems, and more particularly to an improved interrogator-responder signalling system utilizing passive responder devices which receive an interrogator signal and generate a response signal at a frequency different from the interrogator signal.

Interrogator-responder signalling systems have been used to monitor the location of manually-operated vehicles along a route or track. Because the interrogator-responder signalling systems of the prior art are rather complex and expensive, the use of interrogators generally has been limited to a few key locations along the route, such as certain main street intersections along a bus route or certain rail yards and switching points along a railroad track. In such a system a transponder is located in each vehicle or train. While such a system is useful in determining when the transponder carrying vehicles pass certain key locations it is of no use in controlling or determining the position of vehicles between such key locations.

The responder devices used in the signalling system previously described are generally "passive" responder devices. A passive responder device is one which requires no local source of energy, relying for its operation on received radio frequency energy transmitted from the interrogator device. Prior art passive responder devices have the disadvantage that they require a high threshold level of radio frequency energy to generate a detectable response signal. Another disadvantage of prior art passive responder devices is that they generate a response signal having a frequency equal to or lower than that of the interrogator signal. This latter disadvantage makes the prior art systems sensitive to noise and other spurious signals generated by random resonant structures located along the track or route.

When interrogator-responder signalling systems are used to monitor the position of remotely-controlled vehicles, the disadvantages of the prior art passive responder devices become safety hazards. If the signalling system responds to spurious signals or does not respond to low energy interrogator signals, the exact location of a remotely-controlled vehicle cannot be determined at the vehicle control center. It is readily apparent that signalling systems using prior art passive responder devices are not compatible with the operation of remotely-controlled vehicles.

Another disadvantage of many prior art responder devices is their relatively high cost. Generally, the high cost is due to the necessity of having several tuned circuits as components of the responder device. Since responder devices for a remotely-controlled vehicle monitoring sytem must be located relatively close together, for example, 100 feet separation between responder devices, to assure accurate monitoring of the vehicle, the cost of such a system using prior art responder devices becomes a severe limitation to the use of remotely-controlled vehicles.

It is therefore an object of the present invention to provide an improved interrogator-responder signalling system.

It is a further object of the present invention to provide an improved interrogator-responder signalling system in which the responder device does not require a high threshold energy level for operation.

It is a further object of the present invention to provide an improved interrogator-responder signalling system in which the response signal generated by the responder device has a higher frequency than the interrogator signal.

It is a further object of the present invention to provide an improved "passive" responder device for use in an interogator-responder signalling system.

In accordance with the present invention a passive responder device is activated by a received signal to produce a response signal that is a harmonic of the received signal. The responder device has a resonant frequency equal to the frequency of the interrogator signal when a small amplitude signal is being received and has a resonant frequency higher than that of the interrogator signal when a large amplitude signal is being received whereby the transponder device is protected against overloads caused by strong interrogating signals.

In a preferred embodiment of the present invention the passive responder device consists of a generally U shaped metal member having a DC blocking capacitor and a non-linear charge vs. voltage characteristic device connected across the open end thereof. In the preferred embodiment the fifth harmonic of the responder signal is sensed to indicate the position of the vehicle.

The above object and other objects inherent in the present invention will become more apparent when read in conjunction with the following specification and drawing in which.

Figure 1:
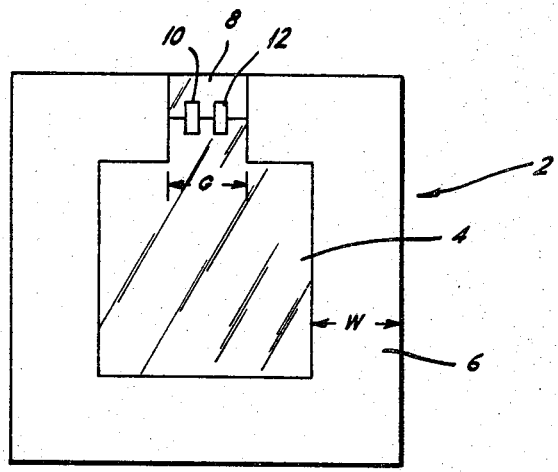
FIG. 1 is a front elevation of the passive responder of the present invention.

Referring to FIG. 1, the passive responder device of the present invention is denoted generally by the reference character 2. It includes a square sheet of a non-conductive material 4, for example, plastic, having a coating of an electrically conductive material 6 on one surface thereof. The coating 6 is generally U shaped. More specifically, the coating 6 forms a continuous border of uniform width W on three sides and a portion of the fourth side of the square sheet of non-conductive material 4. The portion of the fourth side of the sheet 4 that is not bordered by the coating 6 defines a gap 8 having a width G. Serially connected across the gap 8 are a capacitor 10 and a harmonic generating device 12. Device 12 may comprise, for example, a voltage variable diode. Capacitor 10 and device 12 may be discrete physical components mounted on sheet 14 or they may be formed on or in sheet 4 by well known screening or diffusion techniques.

Figure 2:
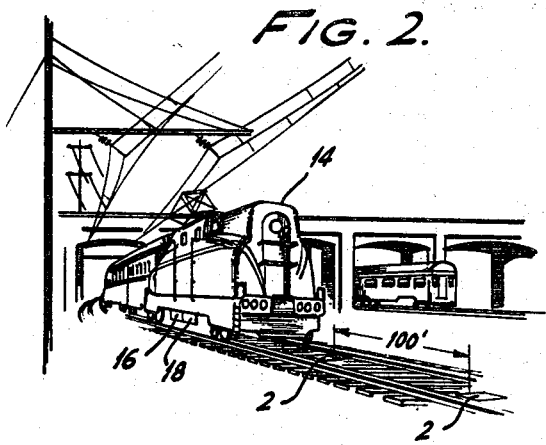
FIG. 2 is a diagram showing a typical signalling system that uses the passive responder device of the present invention.

FIG. 2 shows how the passive responder device of FIG. 1 can be used to determine the location of a vehicle along a track or right-of-way. There is shown a vehicle 14 having a transmitter 16 and a receiver 18 mounted at one side thereof. If desired the transmitter 16 and the receiver 18 can be integrated into one physical assembly.

Figure 3:
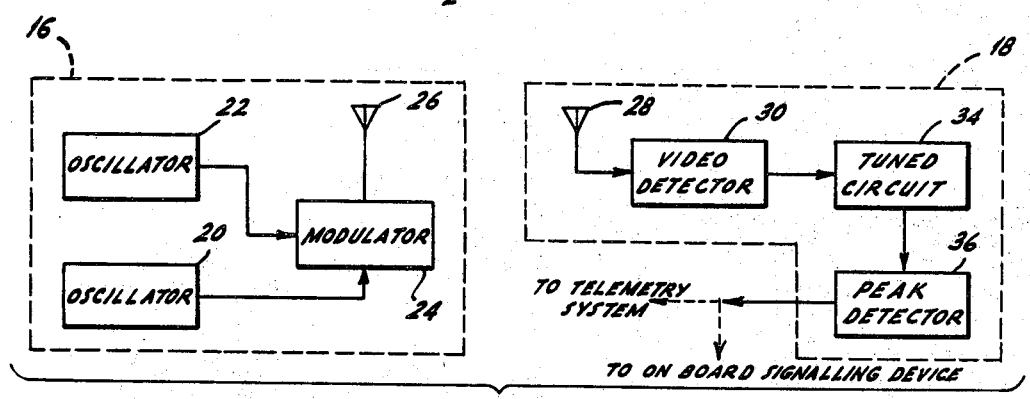
FIG. 3 is a schematic block diagram of portions of the system of FIG. 2.

The transmitter 16, a block diagram of which is shown in FIG. 3, includes a first oscillator 20, which can be any conventional oscillator for generating an interrogator carrier signal in the 450–460 mHz. range, and a second oscillator 22 for generating an audio modulation signal which can be about 1 kHz. Different vehicles may utilize different audio modulation signals. Transmitters 16 also includes a modulator 24 coupled to the first and second oscillators 20 and 22 and a transmitting antenna 26 coupled to the output of the modulator 24. The antenna 26 can be a quarter wave antenna worked against a ground plane. Modulator 24 amplitude modulates the carrier signal from oscillator 20 in accordance with the audio modulation signal from oscillator 22.

The receiver 18, a block diagram of which is also shown in FIG. 3, includes a receiving antenna 28 and a video detector 30 coupled to the receiving antenna 28. The receiving antenna 28 can be a waveguide antenna and the video detector can be a standard crystal video detector.

The output signal from the video detector 30 is supplied to a tuned circuit 34, the output signal of which is supplied to a peak detector 36. Tuned circuit 34 is tuned to the frequency of the audio modulation signal supplied by oscillator 22 and peak detector 36 is a conventional peak detector having a discharge time constant which is long compared to the period of the audio modulation signal supplied by oscillator 22. Since the transmitter 16 and the receiver 18 are of conventional construction, no further explanation of their operation is required.

When the vehicle 14 is being remotely-controlled, the output signal from detector 36 can be supplied by means of a standard telemetry system (not shown) to a central control station (not shown). Alternatively, if the vehicle 14 is not remotely-controlled, the output signal from detector 36 can be supplied to an on-board signalling device, such as an odometer.

In the example chosen for illustration, the responder devices 2 are located every 100 feet along the track. In a specific embodiment of the responder device 2 which has operated successfully when used wtih an interrogator signal of 456 megacycles, the sides of the sheet 4 were 3½ inches long, the width W of the coating 6 was ¾ of an inch, and the width G of the gap 8 in the coating 6 on the fourth side of the sheet 4 was ⅝ of an inch. The overall thickness of the responder device was approximately ⅟₁₆ of an inch. The coating 6 was approximately ⅟₅₀ of an inch and was formed by conventional printed circuit techniques. The capacitor 10 was approximately 1000 pf. and the harmonic generating device 12 was a 1N270 germanium diode. The foregoing parameters provide a responder device which is resonant at approximately 456 megacycles when no signal is being received from the transmitter 16.

Figure 4:
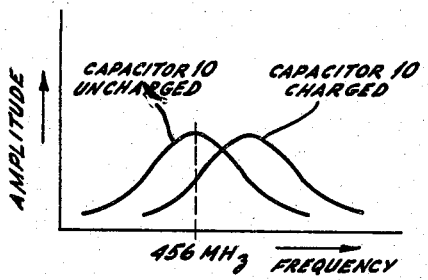
FIG. 4 is a graph showing the resonance characteristics of the responder device of FIG. 1.

When the vehicle 14 approaches a responder device 2, the responder device 2 is placed in the field of the energy radiated by transmitter antenna 26. Since the responder devices 2 are designed so that their resonant frequency corresponds to the transmitter signal frequency when the transmitter signal is initially being received, i.e. when the received signal is relatively weak and the capacitor 18 is not charged, a weak signal from transmitter 16 is situated at the center of the resonant circuit bandpass of the responder device 2 being approached. This produces a relatively large current flow in the responder device 2 being approached. As the vehicle comes closer to the responder device 2, the amplitude of the transmitter signal incident upon the responder device 2 increases and, as a result thereof, the capacitor 10 becomes charged. The charging of the capacitor 10 back biases the diode 12, decreasing its capacitance and thereby increasing the resonant frequency of the responder device 2. FIG. 4 shows the bandpass characteristics of the responder devices 2 for the charged and uncharged conditions of the capacitor 10.

Since the responder device 2 is designed so that its bandpass for the higher resonant frequency, i.e. when capacitor 10 is charged, encompasses the transmitter frequency (456 megacycles), the larger amplitude signals from the transmitter 16 are also detected by the responder device 2. From the foregoing it is apparent that the signalling system is sensitive to low amplitude signals. Capacitor 10 prevents the generation of excessive voltage in the responder device 2 when large amplitude signals are being received. This prevents damage to the diode 12.

By virtue of the non-linearity of the charge vs. voltage characteristics of the diode 12, harmonics of the fundamental resonant frequency of the responder devices 2 are generated. Due to the asymmetrical nature of the loop formed by the coating 6, i.e. a high impedance path at only one end of the loop formed by the coating 6, odd harmonics of the fundamental frequency are generated at enhanced amplitudes.

In the system tested the receiver antenna 28 was tuned to exclude harmonics of the transmitter signal below the fifth harmonic of the signal, i.e. approximately 2.3 gHz. Although the fifth harmonic produced adequate results. the fifth harmonic is only exemplary and the invention should not be limited thereto. By having the receiver tuned to a harmonic of the resonant frequency, the system of FIG. 2 is less sensitive to noise and other spurious signals since very high frequency spurious signals generally are not generated by random resonant structures located along the route of the vehicle.

The responder signal is detected by the video detector 30 and the resultant audio frequency signal is supplied through the tuned circuit 34 to the peak detector 36. The signal from the peak detector 36 is in the form of audio bursts which can be transmitted to the central control station (not shown) by a conventional telemetry system (not shown). By counting the number of signals from any one receiver 18, it is possible for a remotely situated tracking device, for example, a computer, to determine the exact position of the vehicle 14.

From the foregoing description of the responder devices 2 it is obvious that they can be manufactured by mass production methods and therefore can be manufactured more cheaply than prior art responder devices. If desired, the capacitor 10 and leads for the diode 12 can be formed as coatings on the sheet 4. Since the responder devices 2 can be fabricated very cheaply it is economically feasible to locate such transponders every few feet, for example every 100 feet, along the route of the vehicle. Since the active components required for the signalling system of the present invention, i.e. the transmitter and receiver, are relatively simple in construction and can be located on the vehicle to be monitored, the entire position signalling system to the present invention is economical and easy to service.

Although the system of the present invention has been described with reference to a position signalling system, the system can also measure other important functions of the vehicle. For example, by detecting the occurrence rate of the signals received from the receiver 18, the velocity of the vehicle 14 can be determined.

While the invention has been described with reference to certain preferred embodiments thereof, it will be apparent that various modifications and other embodiments thereof will occur to those skilled in the art within the scope of the invention. Accordingly I desire that the scope of my invention be limited only by the appended claims.

What I claim is:

1. An interrogator-responder signalling system, comprising an interrogator device for producing and transmitting an interrogator signal of a predetermined frequency, and a plurality of passive responder devices; said interrogator device being relatively movable with respect to said responder devices; each of said responder devices being responsive to said interrogator signal when received as the interrogator device approaches said responder device and operative when energized by said interrogator signal to provide a response signal and frequency of which is a harmonic of said predetermined frequency; and means responsive to said response signal for generating a control signal.

2. The system of claim 1 in which each of said responder devices comprises a generally flat, U-shaped conductive member, and a capacitor and a harmonic generating device serially connected across the open end of said U-shaped conductive member.

3. The system of claim 2 in which each of said responder devices has a resonant frequency equal to said predetermined frequency, said means of claim 1 is responsive to the fifth harmonic of said predetermined frequency signal, and said harmonic generating device is a voltage sensitive diode which shifts the resonant frequency of each of said responder devices when strong interrogator signals are received.

4. A passive responder device responsive to a interrogator signal of a predetermined frequency, consisting of a generally flat, U-shaped conductive member, and a capacitor and a harmonic generating device serially connected across the open end of said U-shaped conductive member.

5. The device of claim 4 in which said harmonic generating device is a voltage sensitive diode whereby the responder device is resonant at said predetermined frequency when a weak signal is being received and is resonant at a different frequency when a strong signal is being received.

6. A passive responder device, consisting of a sheet of non-conductive material, a continuous coating of conductive material on three sides and a portion of the fourth side of one surface of said sheet; the portion of said fourth side of said one surface of said sheet that is not coated with conductive material defining a gap; and a capacitor and a harmonic generating device serially connected across said gap.

7. The device of claim 6 in which: (1) said coating of conductive material is approximately ¾ of an inch wide and not more than approximately 1/60 of an inch thick, (2) said gap is approximately ⅝ of an inch wide, (3) said sheet of non-conductive material is a square with each side 3½ inches long, and (4) said harmonic generating device is a voltage sensitive diode.

References Cited

UNITED STATES PATENTS

| | | | |
|---|---|---|---|
| 3,018,475 | 1/1962 | Kleist et al. | 343—6.8 |
| 3,054,100 | 9/1962 | Jones | 343—6.5 |
| 3,182,314 | 5/1965 | Kleist et al. | 343—6.5 |
| 3,182,315 | 5/1965 | Sweeney | 343—6.5 |

RODNEY D. BENNETT, *Primary Examiner.*

M. F. HUBLER, *Assistant Examiner.*